Oct. 4, 1960 A. P. J. B. CUQ 2,954,685
UNIVERSAL JOINTS
Filed Oct. 30, 1959 2 Sheets-Sheet 1
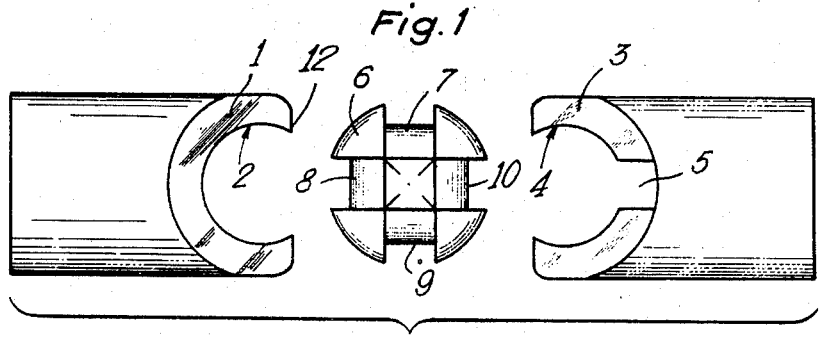
Fig.1
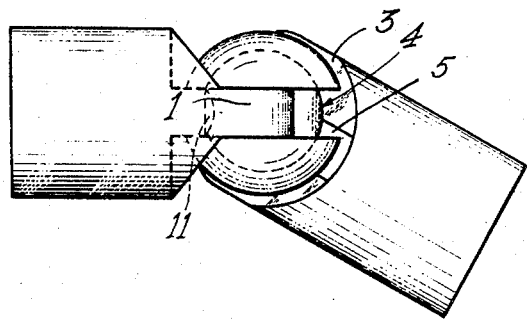
Fig.2
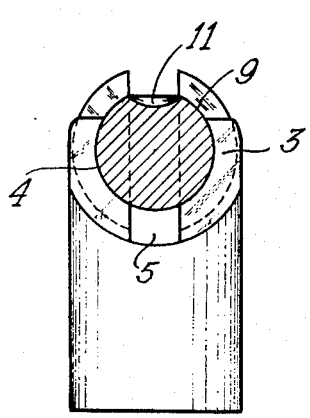 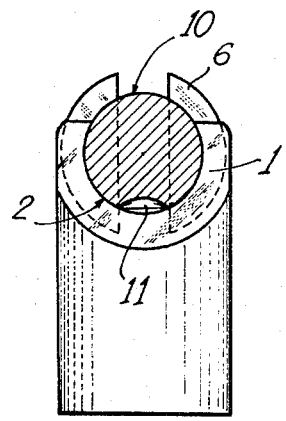
Fig.3  Fig.4

United States Patent Office 2,954,685
Patented Oct. 4, 1960

2,954,685

UNIVERSAL JOINTS

Auguste Pierre Jacques Bernard Cuq, 49 Boulevard du General Ferrie, Saint-Maur-des-Fosses, France Filed Oct. 30, 1959, Ser. No. 849,955

Claims priority, application France Nov. 6, 1958

3 Claims. (Cl. 64—16)

The present invention relates to an improvement effected in universal joints of the type in which a core, consisting of a grooved ball, is interposed between two forks the prongs of which are lodged in the grooves, the latter being laid out along two diametrical planes at right angles to each other.

Conventional joints of this type embody at least one notch at the bottom of one of the forks and flat faces located at the crossover points on the core.

This notch and these flat faces, which are indispensable for assembly purposes, entail not only reductions in the cylindrical bearing areas between the forks and the core, but are also the cause of periodic variations in the extent of these areas during operation of the joint.

In addition, in well-known joints of this type, the forks terminate in facets located in a same plane slightly above a diameter of the cylindrical pivoting surface on the core taken parallel to said plane. Thus the jaws of the fork encompass the combined cylindrical bearing surface of the core, and the faces of the jaws are applied against the flanks of the core, which surround said combined bearing surface. The extremities of the jaws are so designed as to ensure that they do not come into contact with the lateral faces of the other fork constituting the universal joint, when the latter is working at its maximum angle of deflection.

The present invention relates to a device of this type wherein the bearing surfaces are not only less reduced in size but also retain a constant value when the joint is in operation, which makes for both increased ruggedness and longer life for the joint.

According to the invention, the core embodies a recess at one only of the two crossover points of the grooves, this recess being located opposite the bottom of the fork which does not embody a notch.

Likewise according to the invention, the extremities of the fork jaws are shaped into two facets the planes of which form a re-entrant dihedron, the surface mitre thus created increasing the extent of the lateral bearing area by a notable proportion.

The following description with reference to the accompanying drawings will enable the manner of execution of the invention to be clearly understood.

Fig. 1 shows the unit consisting of the two forks and the core, prior to assembly.

Fig. 2 shows the unit in assembled form.

Fig. 3 shows the core mounted in the notched fork.

Fig. 4 also shows, in cross-section, the core mounted in the un-notched fork.

Figure 5:
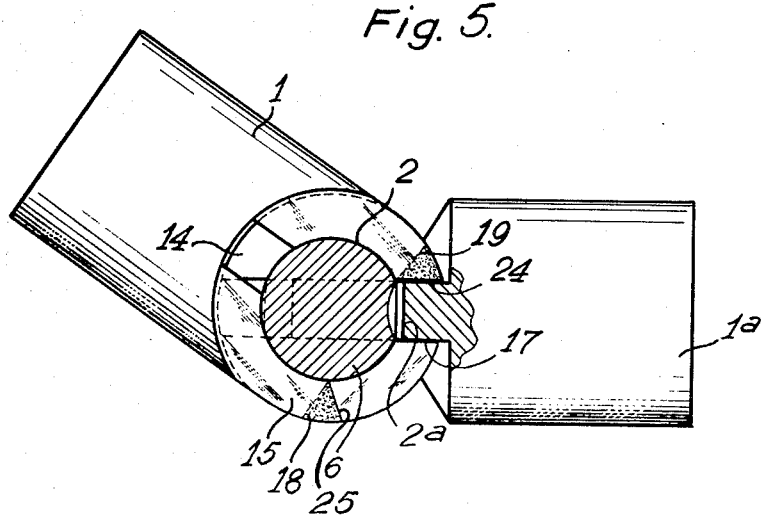

Fig. 5 is a partial cutaway view of a universal joint with forks and core of increased cylindrical and lateral bearing surfaces.

Figure 6:
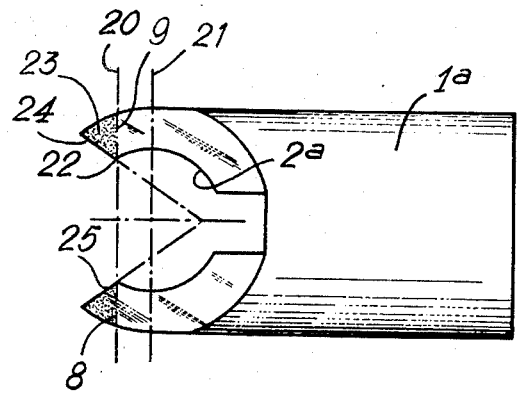

Fig. 6 is a view, in elevation, of one of the forks alone.

Referring now to the drawings, the joint illustrated comprises a fork 1 whose un-notched bearing surface 2 encompasses slightly more than a semi-circle and a fork 3 whose bearing surface 4, which likewise encompasses slightly more than a semi-circle, embodies a notch 5 the width of which is equal to or slightly greater than the thickness of the jaws of the fork 1. These two forks are capable of being successively mounted onto a core 6 which is of overall spherical shape but which is provided with two grooves 7 and 8 perpendicular to each other.

The bottoms of these grooves respectively constitute bearing surfaces 9 and 10 against which are applied the bearing surfaces 2 and 4 of the forks. One of the crossover points of the bearing surfaces 9 and 10 features a recessed portion 11 designed to allow the forks to be successively slipped into position.

Assembly of such a joint is effected in the same way as for conventional joints, the only difference being that the forks are inserted not by a movement of translation relative to the core, but with a slight rolling motion; one of the points 12 of a fork is placed in the recessed portion 11 and the opposite point is slipped into position by sliding it along the length of the cylindrical bearing surface opposite the recessed portion, the contours of the latter being specifically designed to allow such a movement.

After assembling, the recessed portion 11 is positioned opposite the un-notched fork 1, the notch 5 in the fork 3 being made to face the continuous parts of the bearing surfaces 9 and 10.

Thus, as is illustrated in Fig. 3, the bearing surface 9 which cooperates with the bearing surface 4 of the fork 3 is provided with a constant area of application, since the notch 5 is never made to coincide with the recessed portion 11. The bearing surface 2 which cooperates with the bearing surface 10 likewise has bearing areas which are maintained constant, due to the fact that the recessed portion 11 never coincides with any notch. The interruption in bearing-surface which results from the width of the notch 5 is equal to that which results from the extent of the recessed portion 11. The bearing surfaces on the two forks thus remain equal, irrespective of the working angle taken up by the joint.

Therefore not only do the bearing areas in a joint perfected thus remain constant, but they are also equal in each of the two forks, which makes for more balanced working. The recessed portion 11 can be obtained by milling, which would ensure that it has straight sides, thus providing for maximum application of the solution of continuity of the bearing surfaces, as is shown in Figs. 1 to 4.

The joint illustrated in Fig. 5 comprises, like the joint described hereinbefore, a forked head 1, articulated onto a core 6 about the whole length of a cylindrical bearing surface 2, the core 6 embodying for this purpose a groove the lateral faces 14 of which hug the corresponding faces 15 of the fork with only a slight clearance. The core 6 embodies a further identical groove which is perpendicular to the first and which likewise mates with the cylindrical bearing surface 2a of the second fork, the latter fork being integral with a shaft element 1a. In the same way, the faces 17 of this groove cooperate with corresponding flanks of the second fork.

In conventional designs, the extremities of the jaws terminate in facets 18 and 19, shown in dotted lines in the drawing, and these facets are customarily contained along a common plane 20 which is located ahead of the parallel diametrical plane 21 of the inner cylindrical bearing surface 2 of the fork. The distance which separates planes 20 and 21 is such that there is effective retention of the fork on the core and that, when the maximum working angle is reached, the inner point 22 of each jaw approaches as much as possible but does not touch the corresponding flank of the opposite fork.

The embodiment illustrated comprises fork jaws each of which flanks are augmented by a mitre 23, so that the bearing area is correspondingly increased. In this way, the ends of the jaws form two facets 24 and 25 which constitute a re-entrant dihedral angle if said facets are plane, the edge of the dihedron being located inside the fork, rearward of the axis of the cylindrical bearing surface.

In a standard product, where the working angle is about 35°, the apex angle of this dihedron is about 70°, and the extra surfaces on the jaws of the fork increase the bearing area in the not-to-be-neglected proportion of some 15%.

Naturally, a number of modifications may be made to the specific embodiments described hereinabove, without departing from the scope of the invention.

What I claim is:

1. In a universal joint of the type presenting forks and a grooved core, in combination, a first shaft integral with a fork the prongs of which extend over more than a half-circle, being limited by a sector-cylindrical bearing surface, a core provided with a pair of crossing grooves having cylindrical bottoms, disposed at right angle, a recess open in said cylindrical bottoms, situated in one of the crossing points of said grooves, a second shaft integral with a second fork the prongs of which extend over more than a half-circle, being limited by a sector-cylindrical bearing surface, said forks being inserted each in one of said grooves, said sector-cylindrical bearing surfaces applied on corresponding cylindrical bottoms, and a notch in said sector-cylindrical bearing surface of said second fork, said notch being disposed at the opposite side of said recess on said core.

2. In a universal joint of the type presenting forks and a grooved core, in combination, a first shaft integral with a fork the prongs of which extend over more than a half-circle, being limited by a sector-cylindrical bearing surface, a core provided with a pair of crossing grooves having cylindrical bottoms, disposed at right angle, a recess open in said cylindrical bottoms, situated in one of the crossing points of said grooves, a bottom for said recess, with a profile corresponding to the cylindrical bottoms of said grooves, whereby the insertion of said forks is effected successively by a rolling motion, one extremity of one prong following said bottom of said recess, a second extremity of same prong following said cylindrical bottom of same groove, a second shaft integral with a second fork the prongs of which extend over more than a half-circle being limited by a sector-cylindrical bearing surface, said forks being inserted each in one of said grooves, said sector-cylindrical bearing surfaces applied on corresponding cylindrical bottoms, and a notch in said sector-cylindrical bearing surface of said second fork, said notch being disposed at the opposite side of said recess on said core.

3. In a universal joint of the type presenting forks and a grooved core, in combination, a first shaft-integral with a fork the prongs of which extend over move than a half-circle, being limited by a sector-cylindrical bearing surface, said prongs being terminated by facets forming a re-entrant dihedral angle the dihedron edge of which is situated in the vicinity of the geometrical axis of the corresponding bearing surface, a core provided with a pair of crossing grooves having cylindrical bottoms, disposed at right angle, a recess open in said cylindrical bottoms, situated in one of the crossing points of said grooves, a second shaft integral with a second fork the prongs of which extend over more than a half-circle, being limited by a sector-cylindrical bearing surface, said prongs being terminated by facets forming a re-entrant dihedral angle the dihedron edge of which is situated in the vicinity of the geometrical axis of the corresponding bearing surface, said forks being each inserted in a corresponding groove of said core, said bearing surfaces being in contact on said cylindrical bottoms, the faces of said prongs being in contact on the flanks of said grooves, and a notch in said sector cylindrical bearing surface of said second fork, said notch being disposed at the opposite side of said recess on said core.

References Cited in the file of this patent

UNITED STATES PATENTS

| | | |
|---|---|---|
| 608,625 | Richards | Aug. 9, 1898 |
| 2,254,972 | Mollart | Sept. 2, 1941 |
| 2,641,115 | Garrison | June 9, 1953 |